United States Patent [19]
Allum et al.

[11] Patent Number: 5,330,604
[45] Date of Patent: Jul. 19, 1994

[54] EDGE JOINTING OF FABRICS

[75] Inventors: Andrew Allum, Darwen; John Jeffery, Blackburn; Ian C. Sayers, Ribchester; Michael D. Spence, Blackburn, all of United Kingdom

[73] Assignee: Scapa Group PLC, Lancashire, England

[21] Appl. No.: 861,592

[22] Filed: Apr. 1, 1992

[30] Foreign Application Priority Data

Apr. 5, 1991 [GB] United Kingdom ............... 9107149

[51] Int. Cl.$^5$ .................. B29C 65/00; B32B 31/26
[52] U.S. Cl. .................. 156/304.7; 156/304.1; 156/304.4; 156/546; 156/177; 28/102; 28/141; 428/104
[58] Field of Search ........... 156/304.1, 304.7, 304.4, 156/501, 502, 505, 546, 545, 544, 176, 177; 28/141, 102, 192; 428/102, 104

[56] References Cited

U.S. PATENT DOCUMENTS

| | | | |
|---|---|---|---|
| 3,314,844 | 4/1967 | Hadley | 156/505 X |
| 3,616,130 | 10/1971 | Rogosch | 156/177 X |
| 3,629,027 | 12/1971 | Germain | 156/301 X |
| 4,410,015 | 10/1983 | Koller | 156/502 X |
| 4,411,722 | 10/1983 | Yazawa | 156/177 X |
| 4,416,713 | 11/1983 | Brooks | 156/502 X |
| 4,771,814 | 9/1988 | Quigley | 28/141 X |
| 5,053,098 | 5/1989 | Perkins | 28/102 X |

Primary Examiner—David A. Simmons
Assistant Examiner—Charles Rainwater
Attorney, Agent, or Firm—Keck, Mahin & Cate

[57] ABSTRACT

A method and apparatus is disclosed for manufacturing papermakers or like fabrics wherein preformed apertured fabric bands are joined together in spaced edge-to-edge disposition in a manner to provide substantial uniformity of construction throughout the fabric width. The invention proposed supporting the bands (11, 12) in spaced parallel disposition on a pinned roller (26) wherein the distribution and configuration of the pins (34) matches the apertures in the bands and creating an infill band in the region between adjacent preformed bands (11, 12) by feeding thermoplastic matrix material to the surface of the pinned roller in said region, causing said matrix material to flow into interstices between the pins and to bond with the material of the preformed bands. Reinforcing yarns (13) will be provided in the region between adjacent preformed bands and extending in a direction parallel to the bands and will be embodied within the matrix material of the joined structure. Transversely extending yarns may be provided on the preformed bands for like encapsulation by the matrix material of the infill band.

8 Claims, 2 Drawing Sheets

EDGE JOINTING OF FABRICS

FIELD OF THE INVENTION

The invention concerns the edge jointing of fabrics, and has more particular reference to a method of and a means for joining together continuous lengths of fabric in side-by-side disposition.

BACKGROUND OF THE INVENTION

In the manufacture of papermachine and like clothing it has been proposed to create an apertured fabric by feeding an array of yarns and polymeric matrix material to the surface of a pinned drum and passing the yarns and matrix material through a roller nip thereat to be pressed into full engagement with the drum surface, the matrix material being in molten form and the resultant apertured sheet material being cooled and removed from the drum. The molten matrix material will ordinarily be provided from a heated reservoir through which the yarns pass, and from which the yarn/matrix material combination is fed to the drum surface, the matrix material flowing into the channels in the profiled drum surface under the effect of the pressure applied by the nip roller.

Papermachine and like fabrics are of significant dimensions, a typical fabric being, say, 60 meters long by 10 meters wide, and such fabrics require a high degree of permeability which is sensibly constant throughout the body of the fabric, although a reduction in permeability is perhaps desirable in the edge regions of the structure. Given the accuracy required of the pins provided on the drum, both as to their small dimensions and close centres, each pin representing a single aperture and an aperture being, for example, 0.2 mm square and the pins being at 1.1 mm centres both in the axial and peripheral directions of the drum, and the need to produce a fabric having a width of significant proportions, for reasons of economy, in terms both of financial and space considerations, it is more realistic to produce a plurality of relatively narrow fabric bands to be joined together in side-by-side disposition, rather than to produce the fabric to its full intended width in the first instance, and it is to this concept that the present invention is directed.

SUMMARY OF THE INVENTION

According to the present invention there is proposed a method of manufacturing a papermakers or like fabric which comprises the steps of supporting a plurality of apertured fabric bands in closely spaced side-by-side disposition with the apertures in the edge region of one band arranged in alignment with and at appropriate centres with respect to those of the other band, providing a pinned support body bridging the space between the edges of the respective adjacent bands, the said support body having a profile corresponding to that of the apertured fabric, feeding yarns and polymeric matrix material to the support body, applying heat to the said space and the adjacent regions of the band edges to melt the matrix material and bring the matrix material into intimate contact with the pinned support body, and cooling the matrix material.

Preferably the fabric bands include transversely extending reinforcing yarns at intervals longitudinally of the band, the said reinforcing yarns protruding from the band edges and, according to a preferred feature of the invention the method includes the further step of engaging the reinforcing yarns with the support body for engagement with and encapsulation by the matrix material.

The invention also includes apparatus for use in practising the method aforesaid which includes a support means to receive and locate apertured bands in spaced side-by-side disposition, the support means being of pinned configuration in the region of the space between the bands and in the adjacent edge regions thereof, feed means in alignment with the said space and arranged to deliver a plurality of side-by-side yarns and matrix material to the support means in said space, heater means overlying said support means in the region of the space, and roller means in nip-forming relationship with the said support means and adapted and arranged to bring the yarns/matrix material into intimate contact with the support means at a location between the spaced adjacent edges of the bands.

In a preferred structure, the support means comprises a rotatably mounted drum having a pinned region thereto, the pinned region extending fully around the drum in the peripheral direction thereof and being of an axial extent at least sufficient to bridge the space between the side-by-side bands and to receive the edge regions of said bands.

BRIEF DESCRIPTION OF THE DRAWINGS

The invention will now be described further, by way of example only, with reference to the accompanying diagrammatic drawings illustrating one embodiment thereof and in which.

BRIEF DESCRIPTION OF THE PREFERRED EMBODIMENTS

Figure 1:
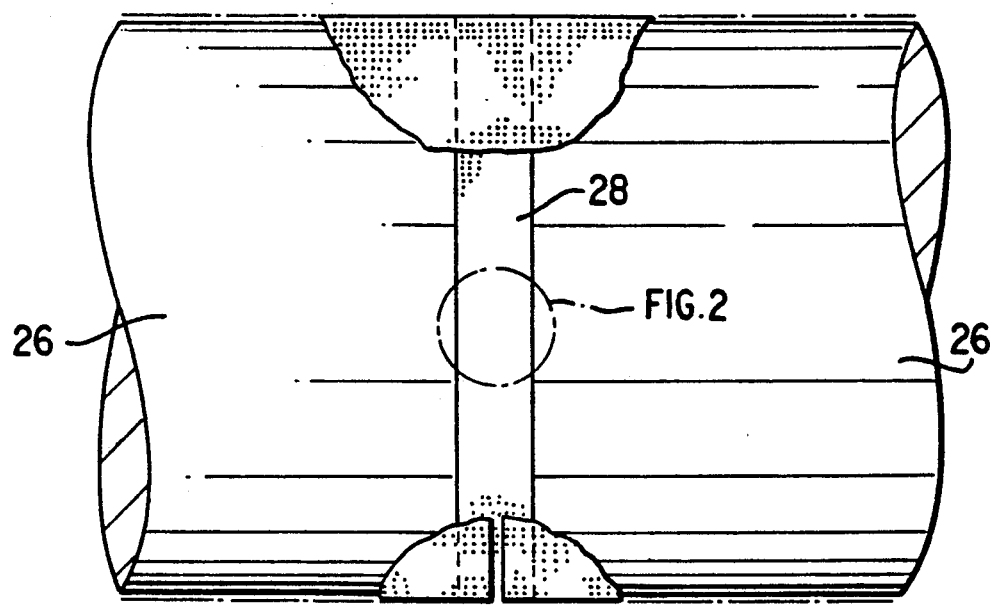
FIG. 1 is a plan view of two apertured fabric bands positioned on a support drum for edge-to-edge joining and shows transverse yarns protruding from the fabric edges, and yarns overlying the space between said edges prior to application of the polymer.
Figure 2:
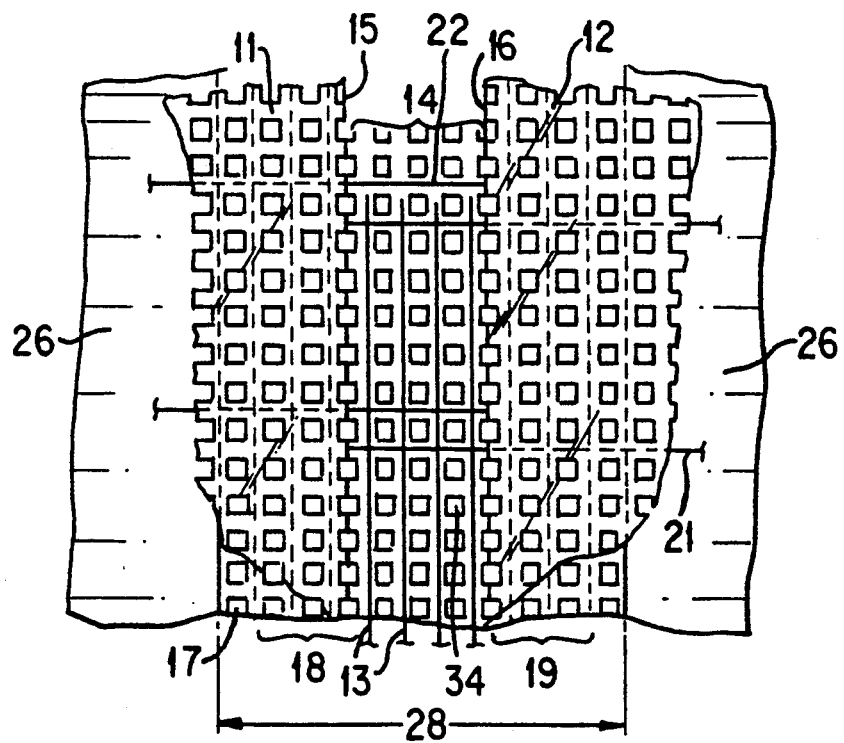
FIG. 2 is an enlarged schematic view of the portion of FIG. 1 shown in broken lines, cut away to show the underlying structure.

A papermaker's fabric, or a structure to be embodied in a papermaker's fabric, is built up from a multiplicity of apertured bands joined together in edge-to-edge relationship. The individual bands are produced by feeding an array of yarns and polymeric matrix material to a pinned drum, and heating the combination so that the polymeric material melts and flows into intimate contact with the profiled surface of the drum to form an apertured matrix having longitudinal and transverse land areas, the yarns being at least partially encapsulated in the matrix material of the longitudinally extending land areas and forming load bearing elements of the band. In order to facilitate the side-by-side joining of the bands, such bands may further include transversely extending yarns at intervals longitudinally thereof, said latter yarns being encapsulated in the transversely extending land areas, and being of a length to protrude from the edge of the band.

Referring now to the drawings, edge-to-edge joining of the bands is effected by positioning the said bands 11, 12 in closely spaced side-by-side disposition, locating a multiplicity of yarns 13 in the space 14 between the band edges 15, 16 and in engagement with a pinned support 17 and introducing powdered polymeric matrix material at an appropriate rate to the yarn on the support and applying heat to the space 14 to melt the said polymeric material and bring said material into intimate relationship with the pinned support 17, thus to create a like apertured structure to that of the individual bands on cooling of the matrix material, the edge regions 18, 19 of the bands likewise being subjected to heat so that the matrix material of such edge regions fuses with that provided by the polymeric matrix material introduced in the space between the band edges. In the event that the bands to be joined include transversely extending yarns, as shown at 21, the protruding ends 22 of the latter yarns are encapsulated in the added matrix material, and serve to enhance the security of the join.

Figure 3:
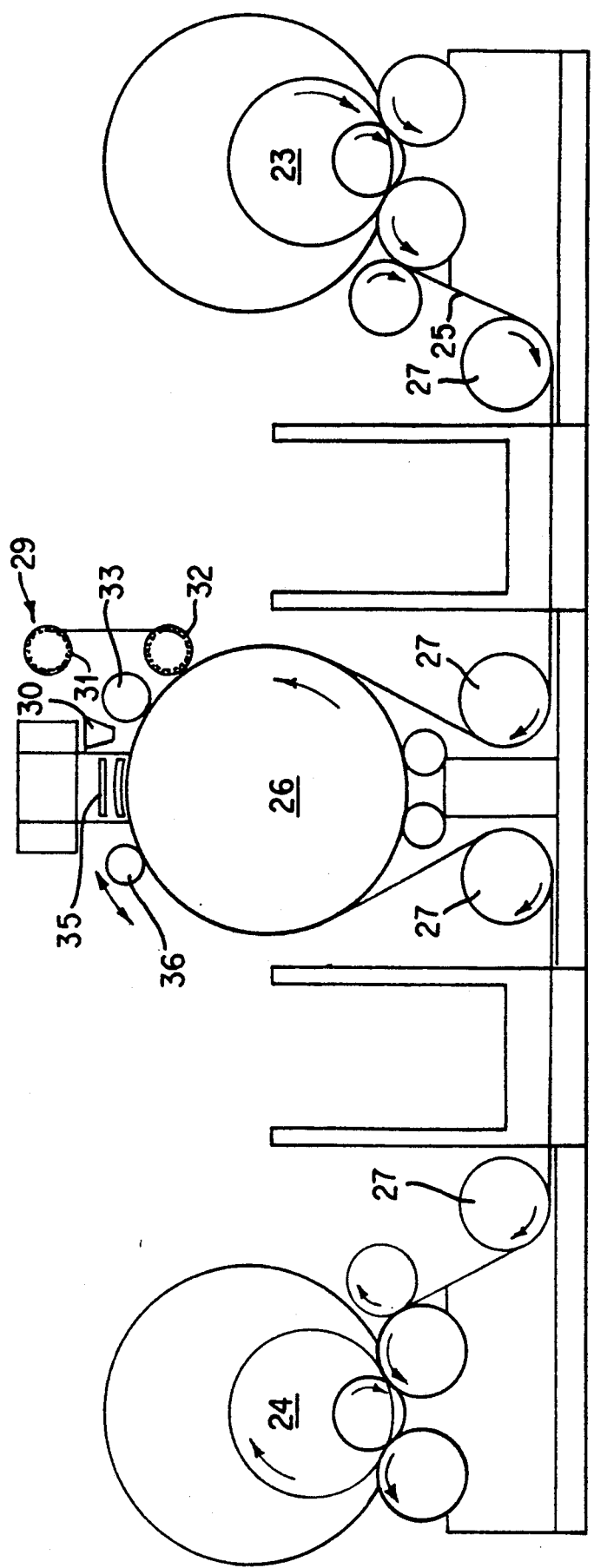
FIG. 3 is a schematic front elevation of the apparatus of the invention.
Figure 4:
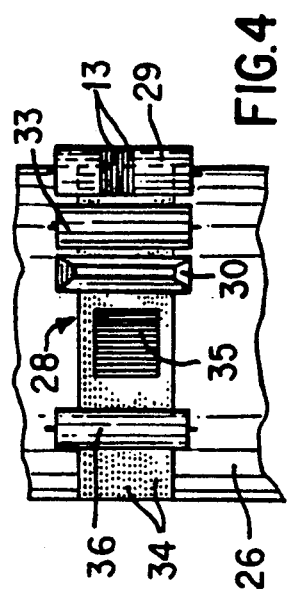
FIG. 4 is a plan view of a part of the apparatus in the region thereof in which the side-by-side jointing of the bands is effected.

Apparatus for use in practising the method is shown in FIGS. 3 and 4, and comprises delivery and take-up rolls 23, 24 for the apertured band material 25, rolls 23, 24 being provided at opposite sides of a support drum 26, the band material 25 being guided to and from the drum 26 by suitable guide rollers 27.

The support drum 26 has a pinned region intermediate the ends thereof (not shown in FIG. 3) of an axial extent materially in excess of the spacing between adjacent edges of the bands to be joined, the said region being provided by a ring 28 applied to the drum and the size and spacing of the pins thereon corresponding to the related dimensions of the apertures in the bands.

A yarn feed means 29 and a polymer feed means 30 are provided adjacent the surface of the support drum 26, the yarn means 29 including a guide roller 31 arranged in spaced parallel disposition with respect to the drum and a delivery roller 32 in nip-forming relationship with said drum, there being a pressure roller 33 likewise in nip forming relationship to the drum to bring the apertures in the edge regions of the bands into engagement with the pins 34 on ring 28 and to press the yarns 13 into the channels existing between the lines of pins (as seen in the peripheral direction of the ring).

Heater means 35 is provided above and in spaced disposition with respect to the pinned ring 28, the heater means being arranged to heat not only the space between the edges of the bands to be joined but also the edge region of each band.

A wiping roller 36 is provided downstream of the heater means, and bears on the drum to bridge the gap between the edges of the two bands.

Cooling means, not shown, will be provided, to effect cooling, and hence setting, of the matrix material.

What is claimed is:

1. A method of manufacturing a papermakers fabric comprising the steps of supporting a plurality of apertured fabric bands in closely spaced side-by-side disposition with the apertures in the edge region of one band arranged in alignment with and at appropriate centers with respect to those of the other band, providing a pinned support body bridging the space between the edges of the respective adjacent bands, the said support body having a profile corresponding to that of the apertured fabric, feeding a plurality of side-by-side yarns and polymeric matrix material to the support body, applying heat to the said space and the adjacent regions of the band edges to melt the matrix material and to bring the matrix material into intimate contact with the edges of the respective adjacent bands, the side-by-side yarns and the pinned support body, and cooling the matrix material.

2. The method as claimed in claim 1 wherein the fabric bands include reinforcing yarns at intervals longitudinally thereof, the method including the further step of engaging the reinforcing yarns with the support body for engagement with and encapsulation by the matrix material.

3. The method as claimed in claim 1, wherein the matrix material is fed to the support body separately from the yarns.

4. The method as claimed in claim 3, wherein the matrix material is provided in powdered form.

5. Apparatus for manufacturing a papermakers fabric comprising a support means to receive and locate apertured bands in spaced side-by-side disposition, the support means being of pinned configuration in the region of the space between the bands and in the adjacent edge regions thereof, feed means in alignment with the said space and arranged to deliver a plurality of side-by-side yarns and polymeric matrix material to the support means in said space, heater means overlying said support means in the region of the space, and roller means in nip-forming relationship with the said support means and adapted and arranged to bring the yarns and matrix material into intimate contact with the support means at a location between the spaced adjacent edges of the bands.

6. Apparatus as claimed in claim 5, wherein the support means comprises a rotatably mounted drum having a pinned region thereto, the pinned region extending fully around the drum in the peripheral direction thereof and being of an axial extent at least sufficient to bridge the space between the side-by-side bands and to receive the edge regions of said bands.

7. Apparatus as claimed in claim 6, wherein the pinned region of the drum is defined by a pinned ring embodied therein.

8. Apparatus as claimed in any claim 5, wherein separate feed means are provided for the supply of yarn and the matrix material.

* * * * *